J. BOUTON.
Corn-Planter.
No. 26,559.  Patented Dec. 27, 1859.
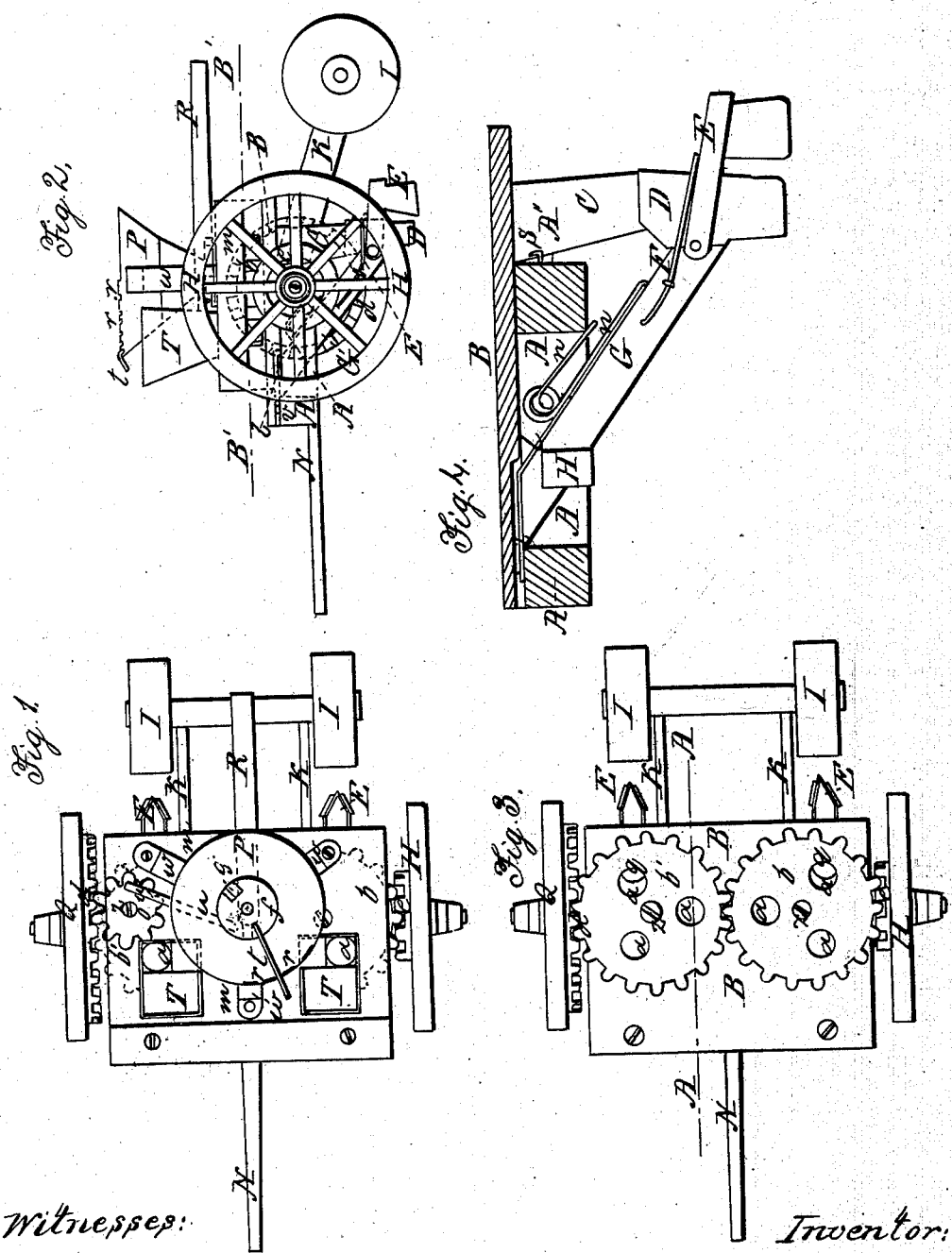

UNITED STATES PATENT OFFICE.

JAMES BOUTON, OF MACON CITY, MISSOURI.

IMPROVEMENT IN SEEDING-MACHINES.

Specification forming part of Letters Patent No. 26,559, dated December 27, 1859.

*To all whom it may concern:*

Be it known that I, JAMES BOUTON, of Macon City, in Macon county, and State of Missouri, have invented a new and Improved Machine for Planting Corn and Sowing Seed Broadcast; and I do hereby declare that the following is a full, clear, and exact description of the same, reference being had to the annexed drawings, making part of this specification, in which—

Figure 1 is a top view; Fig. 2, a side elevation; Fig. 3, a top view when the plate M, and all above it is removed; and Fig. 4 is a section through the line A' A' upon an enlarged scale, all of which will be hereinafter explained.

To enable others skilled in the arts to which my invention appertains to make and use the same, I will proceed to describe the construction and operation thereof.

Similar letters of reference represent corresponding parts of the different figures of the drawings annexed.

Upon the drawings, A represents the frame of the machine, which may be of the form shown, or of such other form as will best fill the conditions of strength and convenience. The frame aforesaid is mounted upon a pair of truck-wheels, Q and X, the back part of the frame, A'', constituting the axle of the said wheels. Upon the frame the plate B is laid and secured. The said plate may be made of wood or metal, as required, and upon the said plate there are two cog-wheels, b b', placed in the relation shown, and so as to revolve about the centers Z. These cog-wheels gear into each other and in the pinion e, fixed upon the wheel X, from whence they also receive their motion. In these wheels b' b there are holes made, as at a a a, just large enough to receive a certain number of seeds; and over the top of these wheels the plate m is fixed upon studs just so as to make it clear the said wheels b' b, and upon this plate m the two hoppers T are fixed and so arranged that one hopper shall be over one of the holes a in the wheels b' b, respectively. The pipe C is attached to the under side of the plate B, through which a hole, a, is cut to correspond with the holes a in the wheels b' b. This pipe C leads in a second pipe, D, which is fixed upon the end of the beam G, and the lower end of which is made somewhat in the nature of a plow, so as to cut a furrow to receive the seed as it is dropped from the machine.

The scraper for covering the seed is shown at E. It is attached to the end of the beam G by means of a pin, as shown, the attaching end being made in the form of a crotch, so as to straddle the pipe D. This said scraper is kept upon the ground with more or less force by means of a spring, F, fixed to the beam G. This beam G is attached to the frame of the machine at v by means of a strap, l, and screw v, as shown, and it is held in position by means of a guide-piece, H, fixed to the frame. The object of attaching this beam in the manner described is to allow the plow-pipe D to yield to any obstruction which may be in the way and which cannot be easily moved, and to prevent the said pipe from rising too easily a spring, n, is introduced between the beam and the frame, as shown.

To roll the earth hard upon the seed, a pair of rollers are used, (shown at I I,) and which are attached to the machine by means of the string-pieces K, which have staples in their upper ends to hook on the hook S. (Shown at Fig. 4.) Now, suppose seed to be supplied to the hoppers T, the machine being in motion, the holes a would be filled as they came opposite the hopper, and from thence the seed would be carried (by the motion of the wheels b' b') to opposite the holes q q, where it would be deposited in the pipe C, and from thence to the ground, where it would be covered in the manner aforesaid. Upon the top of the plate m another hopper, P, is fixed by means of the braces w, and in this hopper a valve, f, is fixed, which has an opening in its edge at y, and directly under this hopper one end of the pipe R is fixed with a hole in it, which corresponds with the hole in the bottom of the hopper P, there being a funnel-shaped mouth-piece over the hole in the pipe, which fits over the under side of the said hopper, which thus forms a center for the said pipe to vibrate around. The inside end of the said pipe is attached to the cog-wheel O, (by means of the ear U,) which meshes in the wheel d on the truck-wheel Q, which thus conveys a vibratory movement to the pipe R, whereby the said pipe sows the seed broadcast. The distance the valve $f$ is open is regulated by the lever $t$, which is held in notches $r\ r$ in any required position.

What I claim as my invention, and desire to secure by Letters Patent, is—

1. The arrangement of the wheels $b'\ b$, pipes C and D, covers E, springs F and $n$, and the yielding-beam $c$, in the manner described.

2. The arrangement of the valve $f$ in the hopper P, in the manner described, for the purpose specified.

JAMES BOUTON.

Witnesses:
   A. RAY,
   AMOS BROADNAX.